United States Patent [19]

Fikse

[11] 4,033,625

[45] July 5, 1977

[54] ADJUSTABLE-LENGTH SEMITRAILER CHASSIS AND METHOD OF SEMITRAILER MANEUVERING

[76] Inventor: Tyman H. Fikse, 4263 S. 172, Seattle, Wash. 98188

[22] Filed: Mar. 28, 1975

[21] Appl. No.: 563,195

[52] U.S. Cl. .......................... 298/22 R; 280/80 B; 280/656

[51] Int. Cl.² .......................................... B60P 1/18

[58] Field of Search .......... 296/23 C, 26; 280/34 R, 280/34 A, 81 R, 656, 80 B; 298/22 R, 22 C, 22 P, 17 R

[56] References Cited

UNITED STATES PATENTS

| | | | |
|---|---|---|---|
| 2,461,577 | 2/1949 | Stark | 280/34 A X |
| 2,996,206 | 8/1961 | McKee | 280/34 A X |
| 3,722,948 | 3/1973 | Walsh | 280/34 A X |
| 3,838,885 | 10/1974 | Brennan | 298/22 R |
| 3,847,405 | 11/1974 | Pearce | 280/656 |
| 3,895,818 | 7/1975 | Fearon | 280/34 R X |

*Primary Examiner*—Albert J. Makay
*Assistant Examiner*—George F. Abraham
*Attorney, Agent, or Firm*—Robert W. Beach

[57] ABSTRACT

The frame of the chassis includes pairs of beams projectable forwardly and rearwardly, respectively from a center frame section on which a load-carrying body is mounted. The forward beam pair and the rear beam pair are projected from the center section corresponding distances by hydraulic jacks connected respectively between such beam pairs and the central section. The jacks are connected to transfer fluid between them, and fluid under pressure is supplied to the jacks to extend one jack and to contract the other jack simultaneously.

24 Claims, 13 Drawing Figures

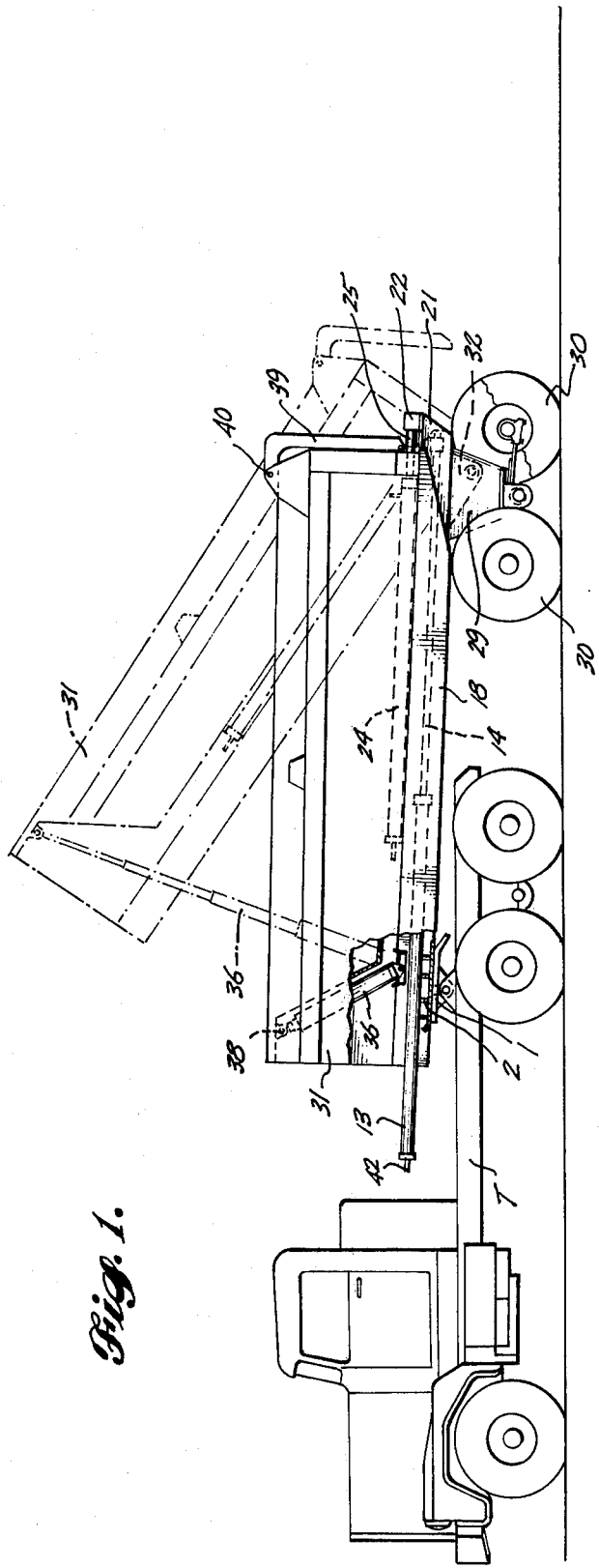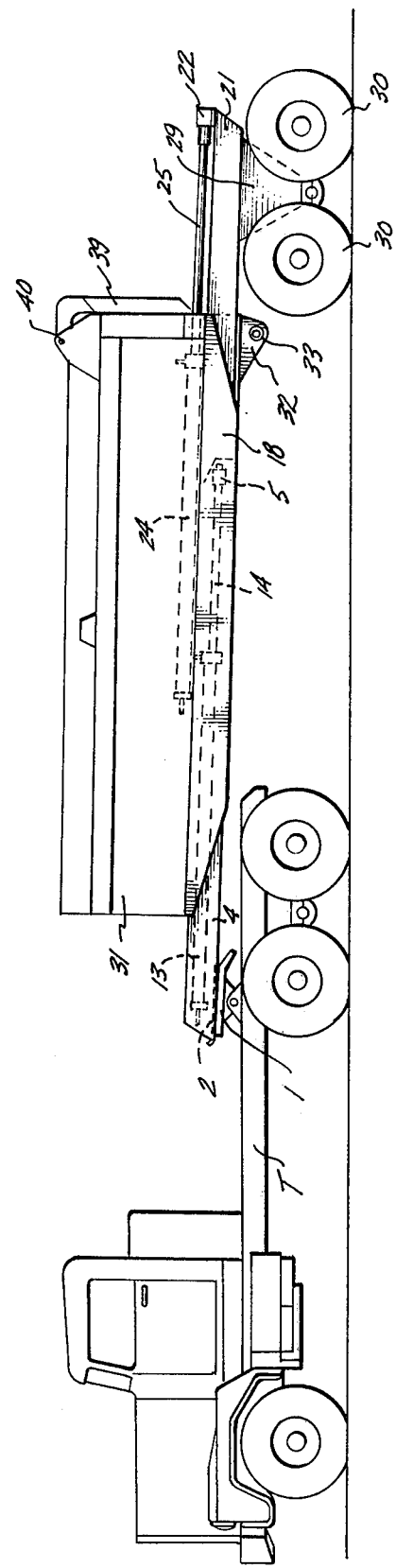

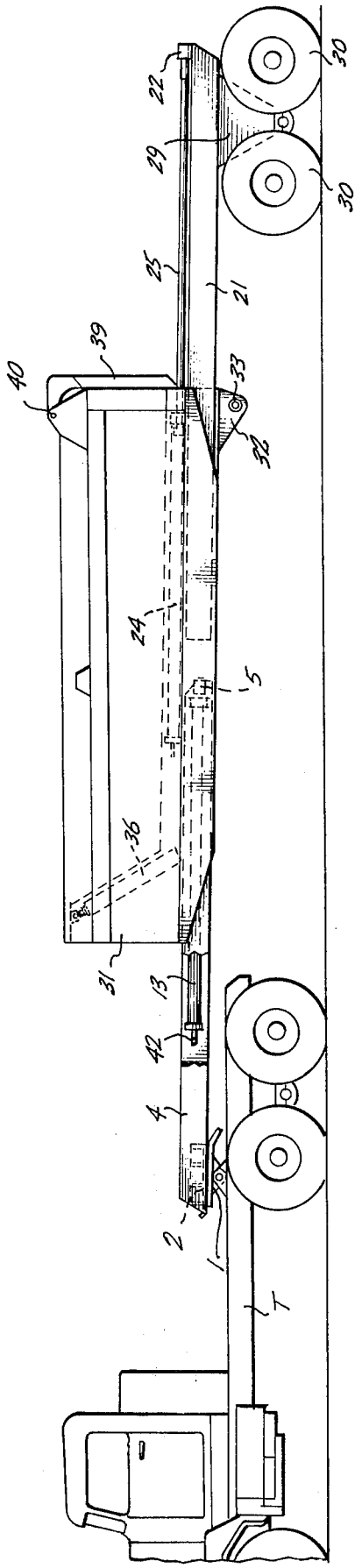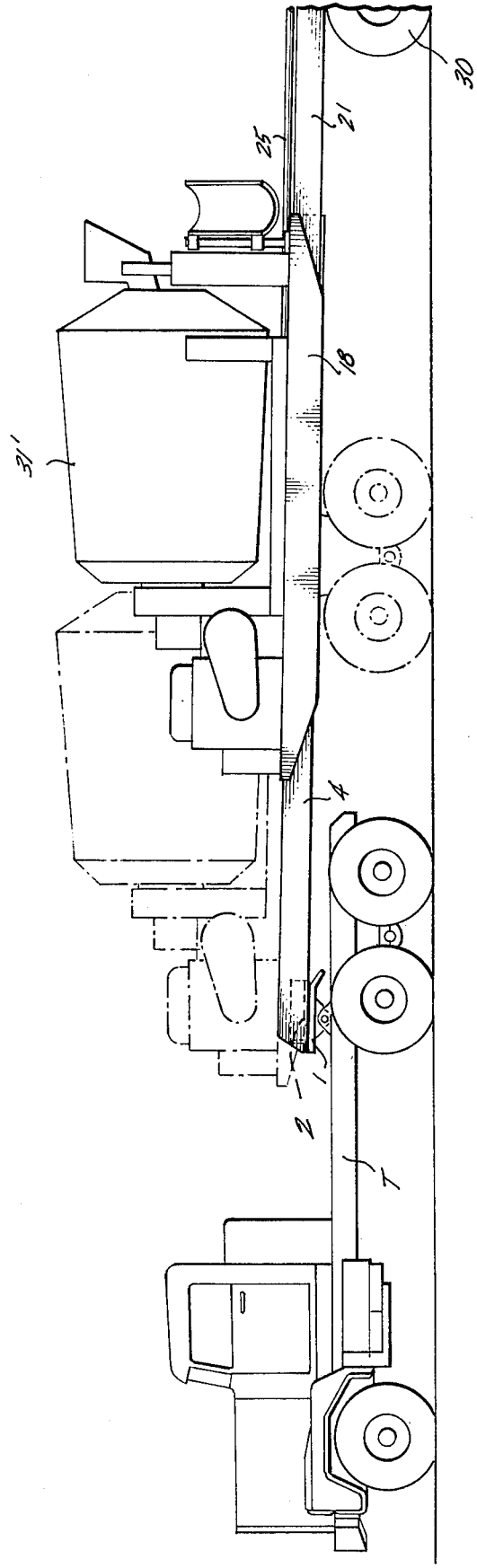

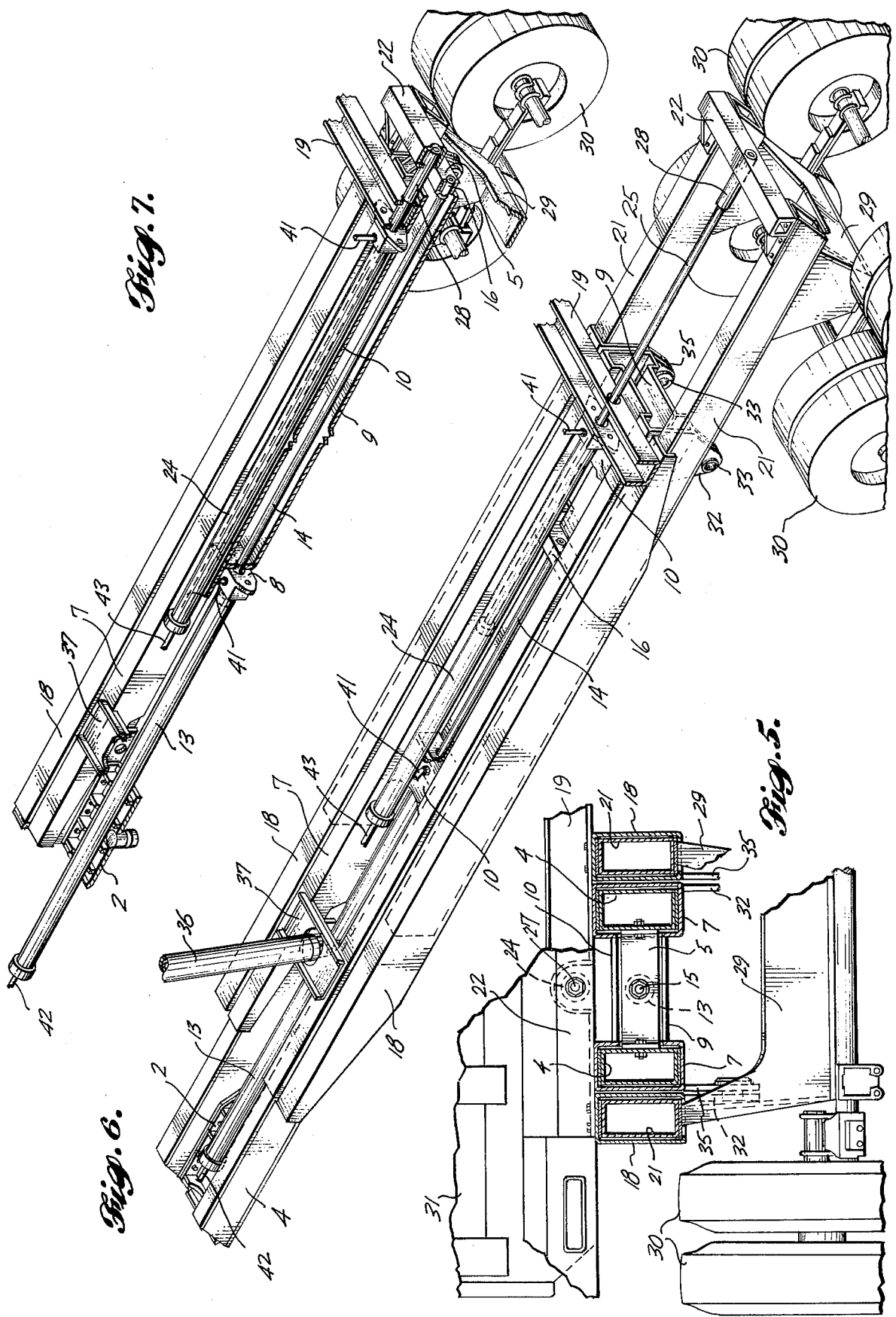

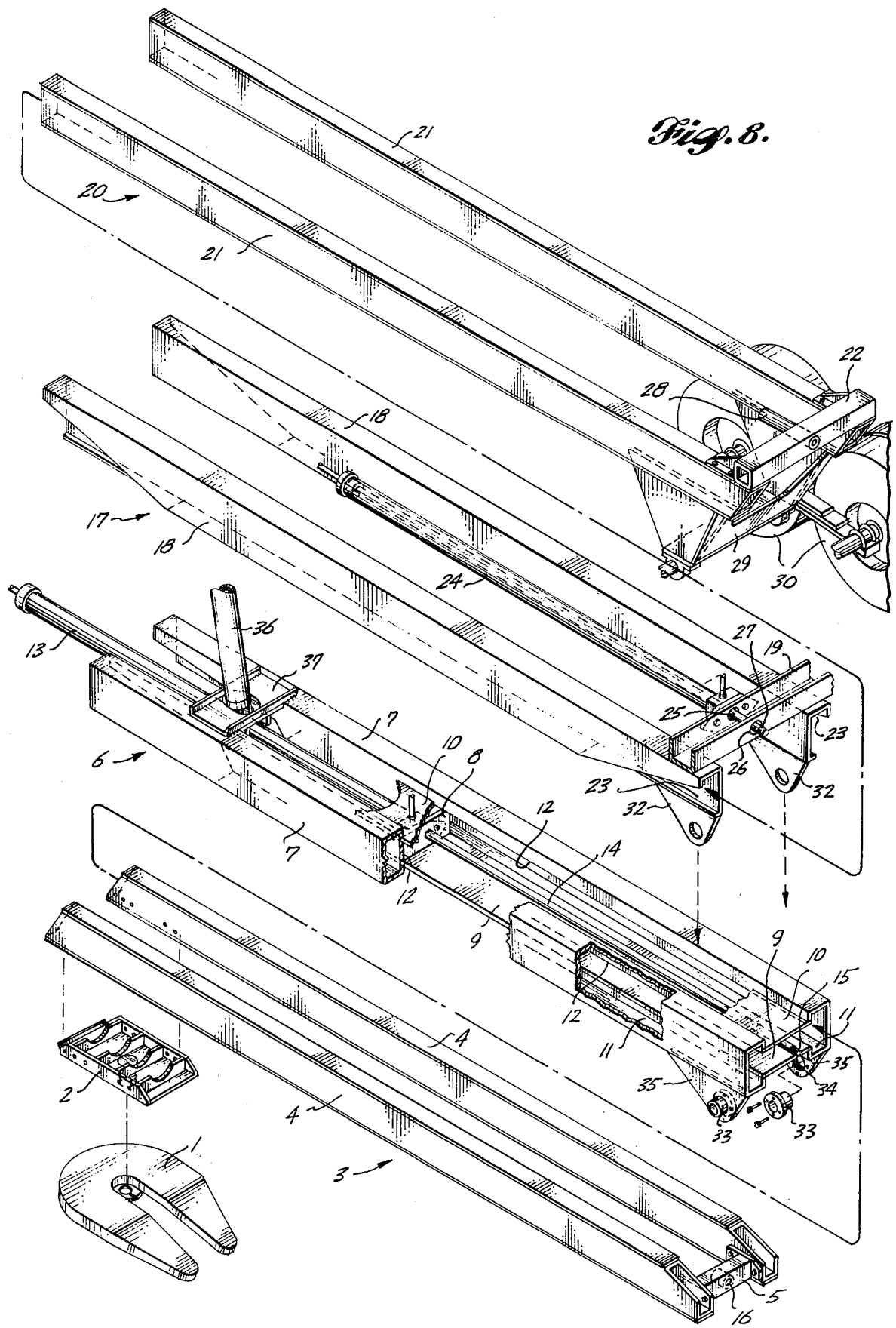

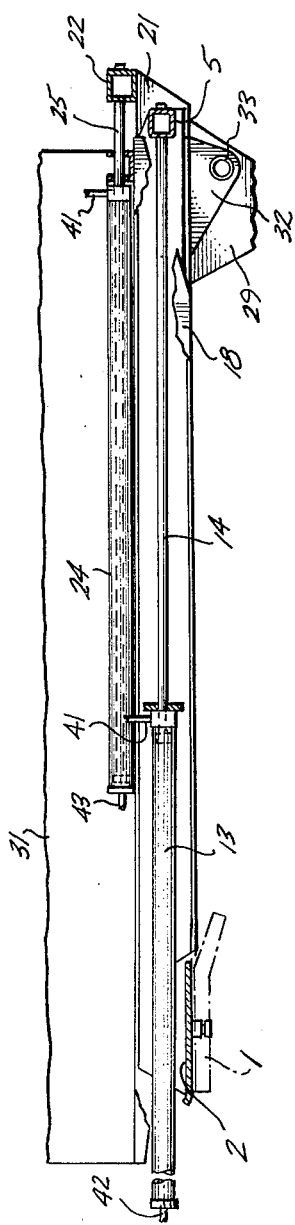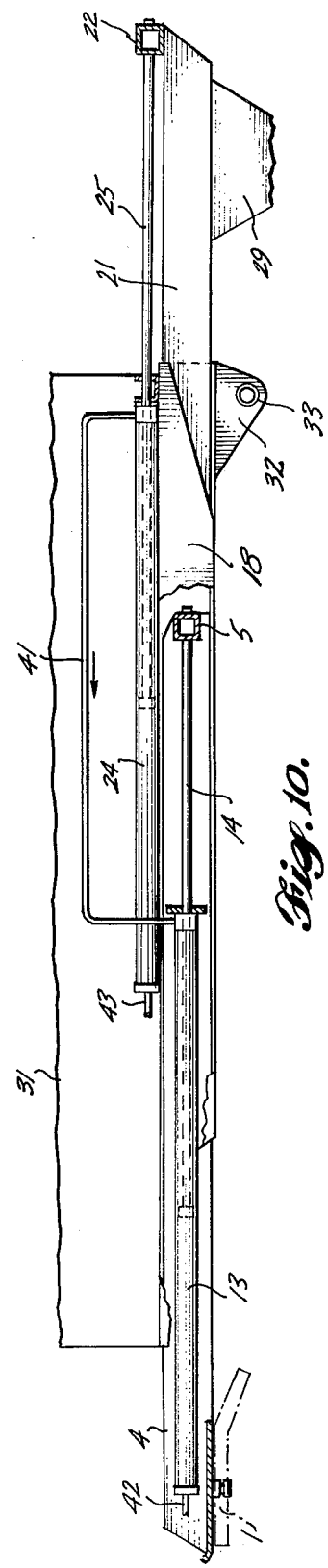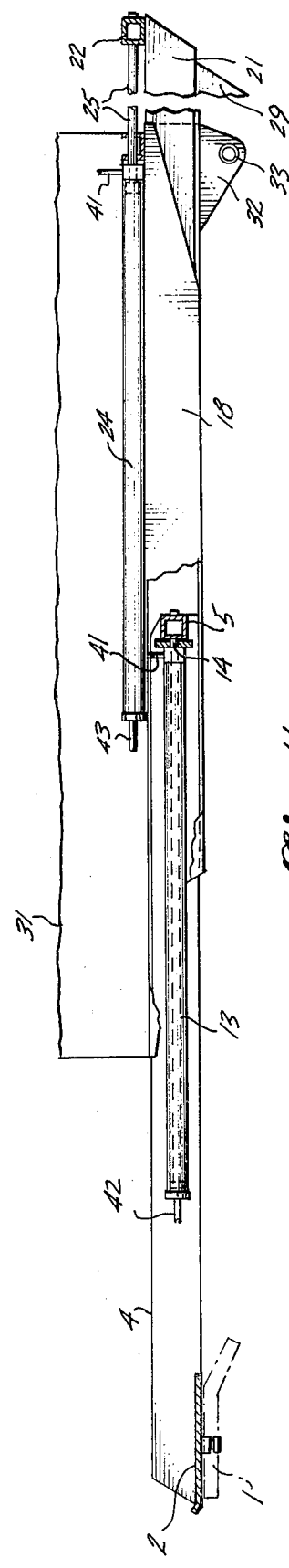

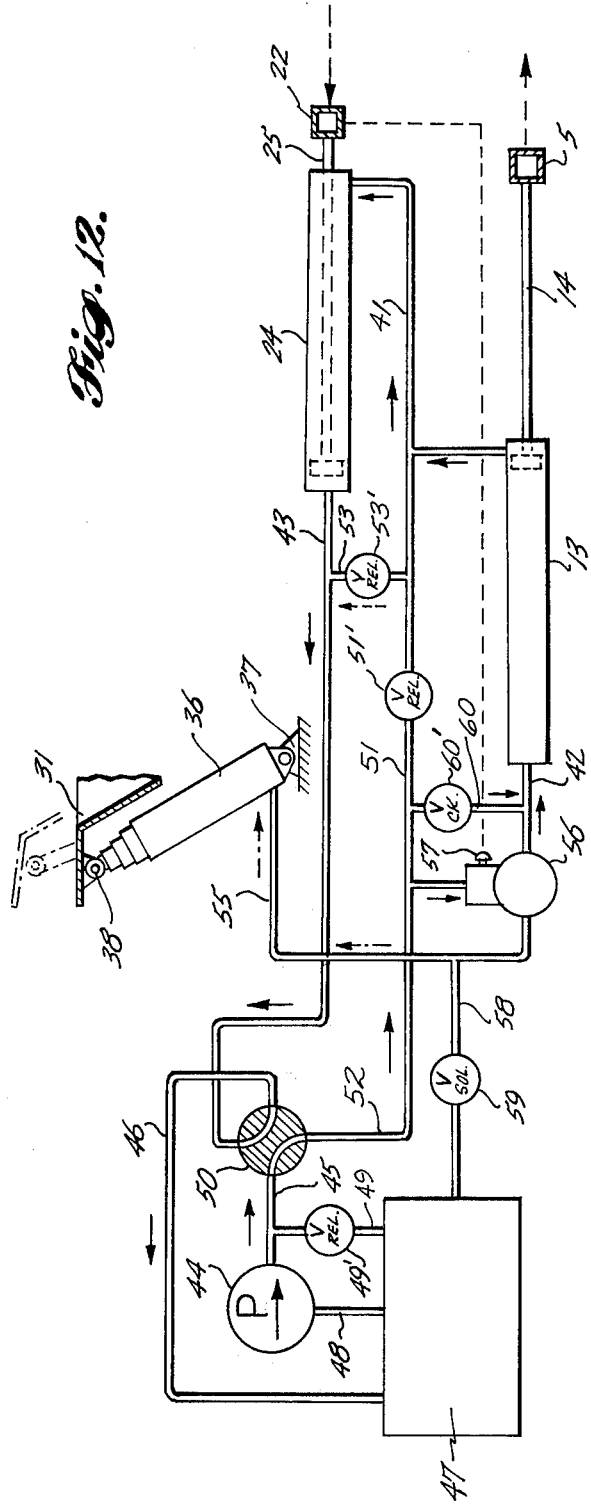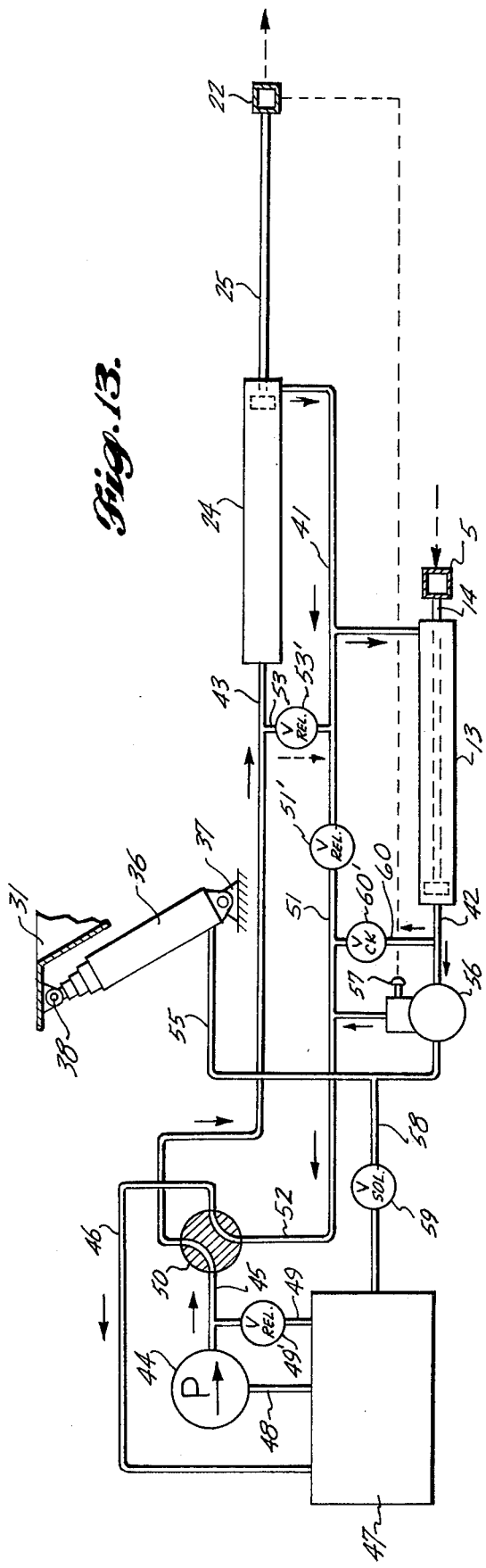

ADJUSTABLE-LENGTH SEMITRAILER CHASSIS AND METHOD OF SEMITRAILER MANEUVERING

BACKGROUND OF THE INVENTION

1. Field of the Invention

The present invention relates to semitrailers having frames adjustable in effective length to alter the spacing between locations on the ground to which the weight of the trailer and the load which it carries is applied.

2. Prior Art

Semitrailers have been used for transporting loads of various kinds, but the chassis of such semitrailers have been of fixed length so that the spacing between the forward connection of the semitrailer to a tractor and the rear wheel assembly of the trailer remains constant.

Because it has been necessary to maneuver semitrailers in close quarters for normal loading, the wheel base of such semitrailers has been made almost as short as possible. Consequently, the weight of the semitrailer and of its load has been transmitted to the ground at relatively close locations. Because of the proximity of the rear truck wheels and the rear semitrailer wheels, highway loads of semitrailers have been limited to a value below their actual carrying capacity. If the wheel assemblies are spaced farther apart to distribute the weight over a greater distance, the semitrailer is too long to maneuver easily in close quarters.

Another problem has arisen in connection with hauling dirt to fill depressions. Where a semitrailer having a dump body filled with dirt must be backed over soft, filled ground to dump its load for continuing to fill a depression, the traction of the rear wheel assembly of the tractor may be sufficiently poor so that either rotation of such wheels cannot propel the semitrailer backward to the brink of the fill, or the semitrailer must be backed with sufficient speed so that rotation of the tractor drive wheels will continue to move the semitrailer rearward to the brink. In the latter case the semitrailer may be driven at such speed and with such momentum that it cannot be stopped at the desired location without great danger of the rear wheel assembly of the semitrailer going over the brink of the fill. Under such circumstances the problem of positioning a semitrailer most advantageously for continuing a fill has been very difficult.

SUMMARY OF THE INVENTION

A principal object of the present invention is to enable the spacing between the connection of a semitrailer to a tractor and the rear wheel assembly of the trailer to be adjusted so as to alter the distribution and dispersion on the ground of the weight of the semitrailer and of the load which it carries.

More particularly it is an object to be able to maintain the center of gravity of the trailer and its load substantially centrally between the connection of the semitrailer to the tractor and the rear wheel assembly of the trailer despite adjustment of the spacing between the tractor connection and the rear wheel assembly.

A further object of the invention is to provide mechanism for altering the spacing between the connection of a trailer to a tractor and the rear wheel assembly of the trailer quickly and easily, either while the trailer is stationary or while it is under way.

Another object is to enable the length of a semitrailer chassis to be altered at will by applying lengthening or shortening force to the semitrailer chassis independently of the wheels supporting the truck or the semitrailer.

It is also an object to utilize the application of force to adjust the length of a semitrailer chassis for the purpose of shifting the truck and/or the semitrailer over the ground without utilizing propulsive force exerted by the tractor wheels.

It is a further object to shift a semitrailer and tractor relative to the ground by braking one set of wheels, applying a force to move the other set of wheels relative to the braked set of wheels, then braking the other set of wheels, releasing the first set of wheels and applying a force to move the released wheels and applying a force to move the released wheels in the same direction as the other set of wheels was moved.

The foregoing objects can be accomplished by utilizing a semitrailer chassis having a telescoping frame, the effective length of which can be altered by elongated actuating means such as a pair of fluid pressure jacks, which jacks are connected respectively between a central section of the frame supporting a load-carrying body and beam members projectable forward and rearward, respectively, from such center section.

BRIEF DESCRIPTION OF THE DRAWINGS

FIG. 1 is a side elevation of a semitrailer according to the present invention, in which the trailer frame is in contracted condition, parts being broken away.

FIG. 2 is a similar view with parts in partially extended condition, and

FIG. 3 is a similar view with parts in fully extended condition.

FIG. 4 is a side elevation corresponding to FIG. 3, showing the trailer chassis supporting a rotary concrete mixer body instead of a dump body.

FIG. 5 is a fragmentary rear elevation of the trailer with parts broken away.

FIG. 6 is a top perspective of a semitrailer chassis with parts broken away, and FIG. 7 is a top perspective of a portion of the semitrailer chassis with parts broken away.

FIG. 8 is a top perspective of the semitrailer chassis with parts in exploded relationship and having portions broken away.

FIGS. 9, 10 and 11 are somewhat diagrammatic longitudinal sections through the semitrailer with parts broken away.

FIGS. 12 and 13 are diagrams of the hydraulic system for adjusting the effective length of the semitrailer.

DETAILED DESCRIPTION

The adjustable-length semitrailer chassis of the present invention has been illustrated in FIGS. 1, 2 and 3 as being applied to a semitrailer equipped with load-carrying means shown in the form of a dump body, but the invention can be utilized with bodies of other types, such as a rotatable concrete mixer body, as shown in FIG. 4. Also, in all of FIGS. 1 to 4 the semitrailer is shown as being connected to the fifth wheel 1 of a tractor T, but the semitrailer can be disconnected from the tractor and its front end supported independently of the tractor by a conventional support when desired.

In general the semitrailer chassis carrying the dump body includes an extendible frame having forward shifting means and rearward shifting means composed of inner and outer nested telescoping frame sections. Each section includes a pair of exterior guide beams within which is telescopically slidable a pair of interior beams. Preferably the beams of both pairs are of box section. The interior slide beams in each instance are projectable forward and rearward, respectively, and are connected to the tractor and to the rear wheel assembly of the semitrailer, respectively.

The forward shifting means includes an inner telescopic frame section which is connected to the fifth wheel 1 of the tractor T by a fifth wheel attachment plate 2. Such plate forms a part of the inner telescopic frame section slide 3 by fitting between and being secured to the forward ends of the slide beams 4, shown best in FIGS. 6 and 8. The rear ends of these slide beams are connected by a crosstie 5 shown in FIGS. 5 and 8. The interior slide 3 is assembled in telescoping relationship with the inner frame section guide 6. Such guide structure is formed by parallel exterior guide beams 7 of box cross section, which are interconnected generally centrally between their ends by a crosstie 8. From that crosstie to their rear ends, the guide beams are connected by a lower bridging plate 9 and an upper bridging plate 10, which are arranged in parallel elevationally spaced relationship.

The interior slide beams 4 fit telescopically in the guide cavities 11 formed by the exterior beams 7, and the crosstie 5 of the slide 3 can move lengthwise of the guide members 7 between the bridging plates 9 and 10 along the slots 12 in the inwardly facing sides of the guide beams 7. The slide and guide elements of the inner telescopic frame section can move relatively between a relationship in which the lengths of the slide 3 and guide 6 are substantially coextensive and a relationship in which the crosstie 5 of the slide is disposed adjacent to the crosstie 8 of the guide, so that the forward end of the slide 3 is projected a substantial distance beyond the forward end of the guide 6.

Telescopic movement of the slide 3 and guide 6 is accomplished by a long fluid pressure jack, preferably of the hydraulic type. Such jack includes a cylinder 13 received between the guide beams 7 and a piston carried by the forward end of a piston rod 14. The end 15 of such piston rod extends into and is anchored in an aperture 16 in the crosstie 5 of the slide 3. Contraction movement of the telescoping slide and guide members will be limited by the piston carried by piston rod 14 reaching the end of cylinder 13 adjacent to crosstie 8. Forward projection of the slide 3 from the guide 6 will be limited by the piston carried by rod 14 reaching the other end of cylinder 13, or by the crosstie 5 of the slide coming into engagement with the crosstie 8 of the guide.

The inner telescoping frame section composed of slide 3 and guide 6 is nested inwardly of an outer telescopic frame section. Such outer telescopic frame section includes a guide 17 having laterally spaced, exterior guide beams 18, the rear ends of which are connected by a crosstie 19. Such guide beams are of box cross section. A slide 20 includes interior slide beams 21 of box cross section. The rear ends of such slide beams are connected by a crosstie 22. Such slide beams slide within the cavities 23 formed by the exterior guide beams 18.

The rear shifting means includes a slide component 20 and guide component 17 of the outer telescoping frame section which are moved longitudinally relative to each other by a long fluid pressure jack, preferably of the hydraulic type. Such jack includes a cylinder 24 located between the guide beams 18 and a piston within such cylinder carried by the forward end of piston rod 25. An aperture 26 is provided in the crosstie 19, through which the rear end 27 of the piston rod 25 extends. Such rod end is suitably anchored to a fitting 28 carried by the crosstie 22 at the rear end of the outer slide 20, as shown in FIGS. 6 and 7.

The rear end of outer slide 20 carries an axle mounting 29 for the rear wheel assembly 30. A dump body 31 is mounted directly on the guide beams 18 of outer guide 17 and is anchored against longitudinal movement relative to such guide. The cylinder 24 extends beneath the dump body and is carried by the crosstie 19. The outer telescoping frame section is mounted to swing with the dump body 31 relative to the inner telescoping frame section by trunnions 33 extending through apertures in ears 32, projecting downward from the rear ends of the outer guide beams 18 and extending through apertures 34 in trunnion-supporting ears 35 projecting downward from the rear ends of the inner guide beams 7.

The dump body 31 is swung upward with the outer telescoping frame section relative to the inner telescoping frame section about the axis of trunnions 33 by a fluid pressure telescoping cylinder jack 36, which preferably is of the hydraulic type. As shown best in FIGS. 1, 6 and 8, the lower end of such compound cylinder jack is mounted on the jack support 37 carried by the forward portion of the inner guide 6. The upper end of such compound cylinder is connected by a pivot 38 to the forward portion of the dump body. When the jack 36 is extended to the broken-line position shown in FIG. 1, the tailgate 39 mounted by pivots 40 on the rear end of the dump body 31 will open for dumping of the load from the body.

Preferably fluid under pressure is supplied to the cylinder 36 for dumping the body from the same source as fluid under pressure is supplied to the cylinders 13 and 24 of the chassis length-adjusting jacks. Provision is made in the fluid pressure supply system for enabling fluid under pressure to be supplied to the dump body tilting jack 36 only when the chassis length-adjusting jacks are in the positions shown in FIGS. 1 and 9, in which the chassis is in its most contracted condition.

As shown in FIGS. 10, 12 and 13, one end of cylinder 13 and one end of cylinder 24 are interconnected by a conduit 41. Through another conduit 42 fluid under pressure can be supplied to and removed from the end of cylinder 13 opposite that to which conduit 41 is connected. Similarly, through conduit 43 fluid under pressure can be supplied to and removed from the end of cylinder 24 opposite that to which conduit 41 is connected.

It is possible to connect the rear ends of cylinders 13 and 24 by a conduit 41 which is only slightly flexible. FIG. 8 shows that the jack cylinder 13 of the inner frame structure is located midway between the beams 7 of the guide 6, and the jack cylinder 24 of the outer frame structure is located midway between the beams 18 of the guide 17. The cylinders should be located in such central positions in order to exert balanced forces on the slidable components of the two frame sections. In order to accommodate the two long jack cylinders both in central positions, FIGS. 9, 10 and 11 show such cylinders to be in superposed overlapping relationship. Also these figures show that the two jack cylinders do not move relatively lengthwise as the lengths of the frame sections are altered. Cylinders 13 and 24 are only swung relatively when the outer frame section is tilted relative to the inner frame section during dumping of the body.

While FIGS. 9, 10 and 11 illustrate the superposed relationship of the jack cylinders 13 and 24 somewhat diagrammatically, FIGS. 6 and 7 show more clearly the relationship between such cylinders and the telescopic frame sections when the frame components are in their assembled relationship.

Fluid under pressure, in particular hydraulic liquid, is supplied from a reservoir 47 to a pump 44. Pump 44 is connected by conduit 45 to a four-way valve 50, by which the fluid is supplied selectively to the conduits 52, 42 and 43. Fluid may be returned from the conduits 42, 52 and 43 through a return conduit 46 which discharges liquid to the reservoir 47. Preferably the pump will remain in operation during a chassis-adjusting operation even though such adjusting operation may be intermittent. Consequently, a connection 49 between the pump discharge conduit 45 and the reservoir 47 is provided which is controlled by a pressure relief valve 49'. Such pressure relief valve can be set to establish the maximum delivery pressure of the pump, such as 2,000 psi (13,790 kN/m$^2$).

Supply of fluid under pressure from pump 44 selectively to conduit 52 and conduit 43 is controlled by four-way valve 50 which can be turned between the position of FIG. 12 and the position of FIG. 13. When such valve is in the position of FIG. 12, the pump supplies liquid under pressure through the conduit 52 connecting valve 50 and conduit 42 of cylinder 13 through valve 56. Liquid thus supplied to this cylinder will force the piston and the cylinder to the right as seen in FIG. 12, which will expel liquid from the right end of the cylinder through the conduit 41 to the right end of cylinder 24. Liquid thus supplied to cylinder 24 will force the piston in such cylinder to the left, which will expel liquid through the discharge conduit 43 connecting cylinder 24 and four-way valve 50. Such liquid passes through a passage of valve 50 and through return conduit 46 to reservoir 47.

When valve 50 is turned from the position of FIG. 12 to the position of FIG. 13, the pump 44 will supply liquid under pressure through a passage of valve 50 and conduit 43 to cylinder 24. Such liquid will force the piston in such cylinder to the right as seen in FIG. 13, which will expel liquid from the right end of the cylinder through conduit 41 to the right end of cylinder 13. The liquid thus supplied to cylinder 13 will force the piston in it to the left to expel liquid from that cylinder through conduit 42, conduit 52, a passage of valve 50 and return conduit 46 back to reservoir 47.

In filling the system with hydraulic liquid initially or in balancing the system from time to time, it may be necessary to supply liquid to or withdraw it from connection 41 between the two cylinders 13 and 24 in order to assure that the pistons of both cylinders move to the ends of their respective strokes. In the case of FIG. 12 the piston in cylinder 13 will be at the extreme right end of such cylinder, and the piston in cylinder 24 will be at the extreme left end of that cylinder. Alternatively, in the situation of FIG. 13 the piston in cylinder 13 will be at the extreme left end of that cylinder, and the piston in cylinder 24 will be at the extreme right end of that cylinder. Liquid can be supplied to the connection 41 through conduit 51 connecting conduit 52 and such connection 41. A valve 51' in conduit 51 will admit liquid to connection 41 if the pressure in such connection is less than 1,000 psi (6895 kN/m$^2$).

On the other hand, if there is more liquid in the cylinders and connection 41 than would permit one piston to move to its extreme right position when the other piston is at its extreme left position, hydraulic liquid could be expelled from the connection 41 through the connection 51 and cross-connection 53 including pressure relief valve 53' to duct 43. Valve 53' can be set for a relatively high by-pass pressure value, such as 3,000 psi (20,684 kN/m$^2$).

Liquid under pressure is supplied to cylinder 36 for dumping the dump body 31 through a conduit 55. Such conduit is connected through a selector valve 56 to the conduit 52. The valve 56 is actuated to divert the flow of liquid from cylinder 13 to conduit 55 by a control 57 operated automatically in response to movement of piston rod 25 to the limiting contracted condition shown in FIG. 12. In other words, when the chassis is adjusted to its shortest condition, which is shown in FIG. 1, the dump body automatically is swung by jack 36 to the broken-line position shown in FIG. 1.

When it is desired to lower the dump body, the four-way valve 50 is moved from the position of FIG. 12 to the position of FIG. 13 at least briefly, so as to move the piston rod 25 sufficiently to the right in cylinder 24 to move valve 56 from its position communicating with conduit 55 to its position communicating with the supply conduit 42 for cylinder 13. Even though at the initiation of such operation liquid cannot be expelled from cylinder 13, the liquid in cylinder 24 and in connection 41 is sufficiently compressible so that piston rod 25 and its piston will move to the right from the limiting position of FIG. 12 a sufficient distance to shift valve 56 from its position connecting conduit 52 and conduit 55 to its position connecting conduit 52 and conduit 42 of cylinder 13.

Shifting of valve 56 for thus severing communication with conduit 55 will trap liquid in the extended dumping cylinder 36 and in the conduit 55. In order to enable the body 31 to descend from the broken-line dumping position of FIG. 1 to the solid-line hauling position shown in that figure, liquid may be discharged from cylinder 36 and conduit 55 through conduit 58 and its valve 59 into the reservoir 47. Valve 59 can be a voluntary valve such as of the solenoid type, energizable from the tractor cab to open the passage through conduit 58 for discharge of hydraulic liquid from clyinder 36. The weight of the dump body 31 will be sufficient to expel liquid from cylinder 36 through conduit 55 and conduit 58 to the reservoir 47 when valve 59 is opened The quantity of hydraulic liquid in the right ends of cylinders 13 and 24 and in conduit 41 connecting them preferably is adjusted when the four-way control valve 50 is in the position shown in FIG. 12. The arrows showing the directions of flow of hydraulic liquid in that figure represent a condition at the end of an operation contracting the length of the semitrailer chassis as much as possible, such as to the condition shown in FIG. 1. Just prior to the parts reaching the position shown in FIGS. 1 and 12, liquid under pressure is being supplied by pump 44 through conduit 52 and valve 56 to conduit 42 of the cylinder 13. Simultaneously, liquid is being transferred from the right end of cylinder 13 to the right end of cylinder 24 through connection 41, and liquid is being discharged from the left end of cylinder 24 through conduit 43, a passage in valve 50 and conduit 46 to the reservoir 47.

When the piston rod 25 reaches its extreme left position of FIGS. 9 and 12, the control 57 will be actuated to shift valve 56 for disconnecting conduit 52 from conduit 42 of cylinder 13 and for connecting conduit 52 to the supply conduit 55 for cylinder 36. At such time the piston in cylinder 13 may not be at the extreme right position. Additional liquid can still be supplied to the left end of cylinder 13 through a connection 60 between conduit 52, 51 and the left end of cylinder 13, bypassing valve 56. Such bypass connection has in it a check valve 60'. Under such circumstances liquid would be supplied by pump 44 simultaneously both through valve 56 to the body-dumping jack 36 and through bypass conduit 60 to the conduit 42 of cylinder 13.

By continuing to supply liquid under pressure to the left end of cylinder 13, if necessary, even after piston rod 25 has been moved fully to the left in cylinder 24, excess liquid can be forced out of the right end of such cylinder and through conduits 41, 51, 53 past valve 53' to conduit 43. By such operation full movement of the piston in cylinder 13 to the right, as well as full movement of the piston in cylinder 24 to the left, will be assured. Alternatively, if the piston in cylinder 13 reaches its limiting position to the right before piston rod 25 has reached its limiting position to the left, additional liquid cannot be received by cylinder 13, but additional liquid will be supplied from conduit 52, through conduit 51 past valve 51', to connection 41 until the piston carried by piston rod 25 is pushed to its limiting position in the left end of cylinder 24. When the piston rod reaches such position, it will actuate valve 56 to change the connection from conduit 42 of cylinder 13 to conduit 55 for supplying liquid to dumping jack 36, as explained previously.

Four-way valve 50 can be moved to a position between the position of FIG. 12 and the position of FIG. 13, in which event the entire amount of liquid under pressure delivered by pump 44 will be returned from the pump discharge conduit 45 to the reservoir 47, through conduit 49 and past pressure relief valve 49', if the pump is in operation. If the semitrailer chassis is substantially in the contracted condition shown in FIG. 1, valve 50 can be turned to the position of FIG. 13, in which event fluid under pressure will be supplied from pump 44 through conduit 45, a passage of valve 50, and conduit 43 to the left end of cylinder 24, for extending piston rod 25. Simultaneously, fluid under pressure transmitted from the right end of cylinder 24 through connection 41 to the right end of cylinder 13 will shift the piston of piston rod 14 to the left to contract that jack to the same extent that piston rod 25 is extended.

Rearward projection of piston rod 25 will project slide beams 21 of the outer frame slide 20 rearwardly from the guide beams 18 of the outer frame guide 17 and body 31. Retraction of piston rod 14 into cylinder 13 will project interior slide beams 4 of the inner frame slide 3 forwardly from the inner frame guide 6 and body 31. If piston rod 25 is projected from its cylinder 24 at the same speed that piston rod 14 is retracted into its cylinder 13, the slide beams 21 of slide 20 will be projected rearwardly at the same speed that the slide beams 4 of slide 3 are projected forwardly, so that the guides 6 and 17 and the body 31 will remain substantially centrally between the connection of the semitrailer to the fifth wheel and the rear wheels 30 irrespective of the extent of movement of the slides relative to the guides.

In the manner described the semitrailer chassis can be extended from the fully contracted condition shown in FIGS. 1, 7 and 9 to the fully extended condition shown in FIGS. 3 and 11, through the intermediate condition shown in FIGS. 2 and 10. At any time, however, the four-way valve 50 can be turned from the position shown in FIG. 13 to a closed position to arrest extension of the semitrailer chassis in any desired intermediate position. When the valve is thus moved, the hydraulic liquid will be sealed in cylinders 13 and 24 so that the chassis will be held positively in the adjusted position selected. Alternatively, the four-way valve 50 can be shifted from a closed position to the position of FIG. 12 for reducing the length of the chassis from an extended condition toward the condition of FIG. 1. Again the valve can be turned into a closed position at any time to lock the length-adjusting jacks in the particular position of adjustment achieved.

A very important feature of the present invention is utilization of power means to adjust the length of the semitrailer chassis. Such power means is shown and has been described as including pump 44 and jacks 13,14 and 24,25, with the associated hydraulic system. Such power mechanism will enable the length of the semitrailer chassis to be adjusted at any time except when the body 31 is being dumped. The power means can be operated to adjust the length of the semitrailer chassis when the tractor and semitrailer are traveling along a road, as well as when the vehicle is stopped.

A particular advantage of providing power means to adjust the length of the semitrailer chassis is that such length adjustment can be used to shift the rear wheels of the semitrailer and the tractor relative to each other, independently of driving propulsion of the tractor. For example, when the semitrailer chassis is in the shortened condition of FIG. 1, the brakes of the tractor can be set and the valve 50 can be shifted from closed position to the position of FIG. 13. The lengthening of the semitrailer chassis thus effected will shift the rear trailer wheels 30 rearward relative to the tractor, such as to the positions shown in FIGS. 2 and 3. When a desired extension has been achieved, the valve 50 can be closed, the tractor brakes released, and the brakes for the rear trailer wheels 30 set. The four-way valve 50 can then be moved from closed position to the position of FIG. 13 for effecting shortening of the semitrailer chassis. Such shortening movement of the chassis will shift the tractor toward the wheels 30.

By such inching movement the rear wheels 30 of the semitrailer can be moved rearwardly without relying on traction of the tractor wheels, such as in traveling over filled ground, for example. The rear trailer wheels 30 can thus be positioned in precisely a desired location such as at the brink of a fill. The brakes of these wheels can then be set and the semitrailer chassis shortened, to pull the tractor toward the rear wheels of the trailer until the chassis has been moved into the shortened condition shown in FIG. 1 and the body 31 has been dumped. With the brakes of the rear wheels 30 of the semitrailer still set, the four-way valve 50 can then be shifted from a closed position to the position of FIG. 13 for contracting jack 13,14 and extending jack 24,25 to extend the semitrailer frame and push the tractor away from the wheels 30 again without any reliance on driving force produced by wheels of the tractor.

The operation of extending the semitrailer frame to move the tractor away from the rear wheels 30 of the trailer can be followed by setting the brakes of the tractor, releasing the brakes of the semitrailer wheels 30 and shortening the semitrailer frame to pull the wheels 30 toward the tractor. The brakes for the semitrailer wheels 30 can then be set again, the brakes of the tractor released, and the semitrailer chassis extended to push the tractor another increment from the semitrailer wheels 30. Such inching of the semitrailer and tractor can be continued as long as necessary until the powered wheels of the tractor can obtain adequate traction to move the vehicle.

While the foregoing description of the adjustable-length semitrailer chassis has been in conjunction with a dump body, the chassis could instead carry a rotatable drum 31' shown in FIG. 4, for transporting concrete premix. The chassis could, of course, be adapted to carry any other type of body that might be desired.

Also, while the preferred embodiment of the invention described above accomplishes length adjustment of the semitrailer chassis with the body always being located approximately centrally between the connection of the semitrailer to the tractor and the rear wheels of the semitrailer, length-adjusting mechanism could be utilized embodying only one jack, so that the relationship of the body either to the tractor or to the rear wheels of the semitrailer would not be changed during alteration in length of the semitrailer chassis.

I claim:

1. A semitrailer comprising load-carrying means, and a chassis supporting said load-carrying means and including front tractor-connecting means, rear wheeled supporting means, powered forward shifting means for moving said load-carrying means forward and rearward relative to said tractor-connecting means and powered rear shifting means for moving said wheeled supporting means forward and rearward relative to said load-carrying means and thereby altering the spacing between locations on the ground to which load carried by said load-carrying means is applied.

2. The semitrailer defined in claim 1, in which the forward shifting means includes extension beam means movable lengthwise relative to the load-carrying means.

3. The semitrailer defined in claim 1, and means coordinating the powered forward shifting means and the powered rear shifting means to operate conjointly for moving the load-carrying means relative to the tractor-connecting means and the wheeled supporting means relative to the load-carrying means, so that the chassis supports the load-carrying means always in a position generally centrally between the tractor-connecting means and the wheeled supporting means.

4. The semitrailer defined in claim 3, in which the chassis includes frame means supporting the load-carrying means, the powered forward shifting means includes forward beam means carrying the tractor-connecting means and projectable forward from said frame means and the powered rear shifting means includes rear beam means attached to the wheeled supporting means and projectable rearward from said frame means.

5. The semitrailer defined in claim 4, in which the powered shifting means includes two extending means variable in effective length, one connected to the forward beam means and the other connected to the rear beam means, said two extending means being disposed in superposed relationship.

6. The semitrailer defined in claim 4, in which the frame means includes guide means for the forward beam means and guide means for the rear beam means, said two guide means being relatively swingable, one of said guide means being connected for tilting with the load-carrying means relative to the other guide means, and the corresponding beam means being tiltable with said tiltable guide means.

7. The semitrailer defined in claim 6, including fluid pressure actuating means for projecting the rear beam means from the frame means and for swinging the tiltable guide means relative to the other guide means.

8. The semitrailer defined in claim 4, in which the powered shifting means includes a pair of fluid jacks, one jack of said pair being connected between the frame means and the forward beam means and the other jack of the pair being connected between the frame means and the rear beam means.

9. The semitrailer defined in claim 8, and means for supplying fluid under pressure to the pair of jacks for simultaneously contracting one jack of the pair and extending the other jack of the pair.

10. The semitrailer defined in claim 8, and means for supplying fluid under pressure to the pair of jacks and moving both jacks to their limiting positions irrespective of the initial positions of the jacks.

11. The semitrailer defined in claim 8, and means interconnecting corresponding ends of the two jacks of the pair for flow of fluid from one jack to the other jack.

12. The semitrailer defined in claim 8, in which the load-carrying means is a dump body, fluid pressure means for tilting the dump body, and conduit means connecting said fluid pressure means and the means for supplying fluid under pressure to the pair of jacks.

13. The semitrailer defined in claim 8, in which the two cylinders of the pair of fluid jacks are disposed in relative superposed relationship.

14. The semitrailer defined in claim 8, in which the load-carrying means is a rotatable drum for transporting concrete premix.

15. The semitrailer defined in claim 1, in which the forward shifting means includes relatively telescoping elongated members.

16. The semitrailer defined in claim 1, in which the forward shifting means includes relatively telescoping elongated members, one member being an exterior beam member in longitudinal fixed relationship to the load-carrying means, and the other member being an interior beam member movable lengthwise relative to said exterior beam member and the load-carrying means.

17. The semitrailer defined in claim 1, in which the forward shifting means includes two pairs of relatively telescoping members spaced apart transversely of the frame means, each of said pairs of relatively telescoping members including an exterior member directly supporting the load-carrying means and an interior member movable lengthwise relative to said exterior member and the load-carrying means, and transverse connecting means connecting the interior beam members of the respective pairs.

18. The semitrailer defined in claim 1, in which the powered shifting means includes a pair of fluid pressure jacks, and means connecting the jacks of said pair to effect extension of one jack and contraction of the other jack simultaneously for adjusting the effective length of the chassis.

19. The semitrailer defined in claim 18, and conduit means connecting corresponding ends of the jacks of the pair.

20. The semitrailer defined in claim 19, and means for supplying fluid under pressure to one of the jacks and to the connection connecting the jacks.

21. The semitrailer defined in claim 18, the load carrying means including a dump body, and fluid pressure dump means connected to the pair of jacks for dumping the dump body.

22. The semitrailer defined in claim 1, in which the powered forward shifting means includes first relatively telescoping elongated members including a first exterior beam member in longitudinal fixed relationship to the load-carrying means and a first interior beam member in longitudinal fixed relationship to the front tractor-connecting means and movable lengthwise relative to said first exterior beam member and the load-carrying means; and in which the powered rear shifting means includes second relatively telescoping elongated members including a second exterior beam member in longitudinal fixed relationship to the load-carrying means and a second interior beam member in longitudinal fixed relationship to the wheel-supporting means and movable lengthwise relative to said second exterior beam member and the load-carrying means.

23. The method of maneuvering a semitrailer-tractor combination having two sets of wheels spaced longitudinally of the combination, which comprises immobilizing a first set of wheels, altering the length of the semitrailer chassis between the two sets of wheels for shifting the second set of wheels in one direction relative to the immobilized first set of wheels, immobilizing the second set of wheels, releasing the first set of wheels, and again altering the length of the chassis between the two sets of wheels for shifting the first set of wheels relative to the second set of wheels in the same direction that the second set of wheels was previously shifted relative to the first set of wheels.

24. The method defined in claim 23, in which one of the chassis length-adjusting steps includes lengthening the chassis, and the other length-adjusting step includes shortening the chassis.

* * * * *